United States Patent

[11] 3,628,003

[72] Inventor David W. Spence
 Palo Alto, Calif.
[21] Appl. No. 18
[22] Filed Jan. 2, 1970
[45] Patented Dec. 14, 1971
[73] Assignee Capital National Bank, Trustee
 Houston, Tex.

[54] BASELINE PROJECTION APPARATUS FOR USE WITH BASELINE DRIFT CORRECTION CIRCUITS
13 Claims, 1 Drawing Fig.
[52] U.S. Cl.................................................. 235/183,
 235/92 NT, 235/151.35, 328/162, 328/165
[51] Int. Cl..................................................... G06g 7/18
[50] Field of Search............................................ 235/183,
 197, 151.35, 92 NT, 92 TF; 307/271; 328/162, 165

[56] References Cited
UNITED STATES PATENTS
3,506,818  4/1970  Smith ........................... 235/183
3,541,320  11/1970  Beall ............................ 235/183

Primary Examiner—Malcolm A. Morrison
Assistant Examiner—Felix D. Gruber
Attorney—Jack W. Hayden ABSTRACT: An analytical measurement signal having recurrent data fluctuations which extend from a baseline value is supplied to a voltage-to-frequency converter which produces output pulses having a repetition rate proportional to the amplitude of the measurement signal. A drift correction circuit is responsive to these pulses for sensing baseline drift and supplying to the input of the voltage-to-frequency converter a correction signal for minimizing such baseline drift. During the occurrence of a data fluctuation, a portion of the drift correction circuit is disabled and a storage capacitor in such circuit supplies a constant correction signal to the voltage-to-frequency converter. A baseline projection circuit is coupled to the drift correction circuit for modifying the constant correction signal used during the occurrence of a data fluctuation in accordance with the estimated baseline drift expected to occur during such time interval. Such baseline projection circuit includes differentiating circuit means for measuring the rate of change of the correction signal just prior to the occurrence of a data fluctuation and means for storing the measured rate of change value in a storage capacitor. This stored rate of change value is then used to vary the correction signal stored by the correction circuit capacitor in accordance therewith.

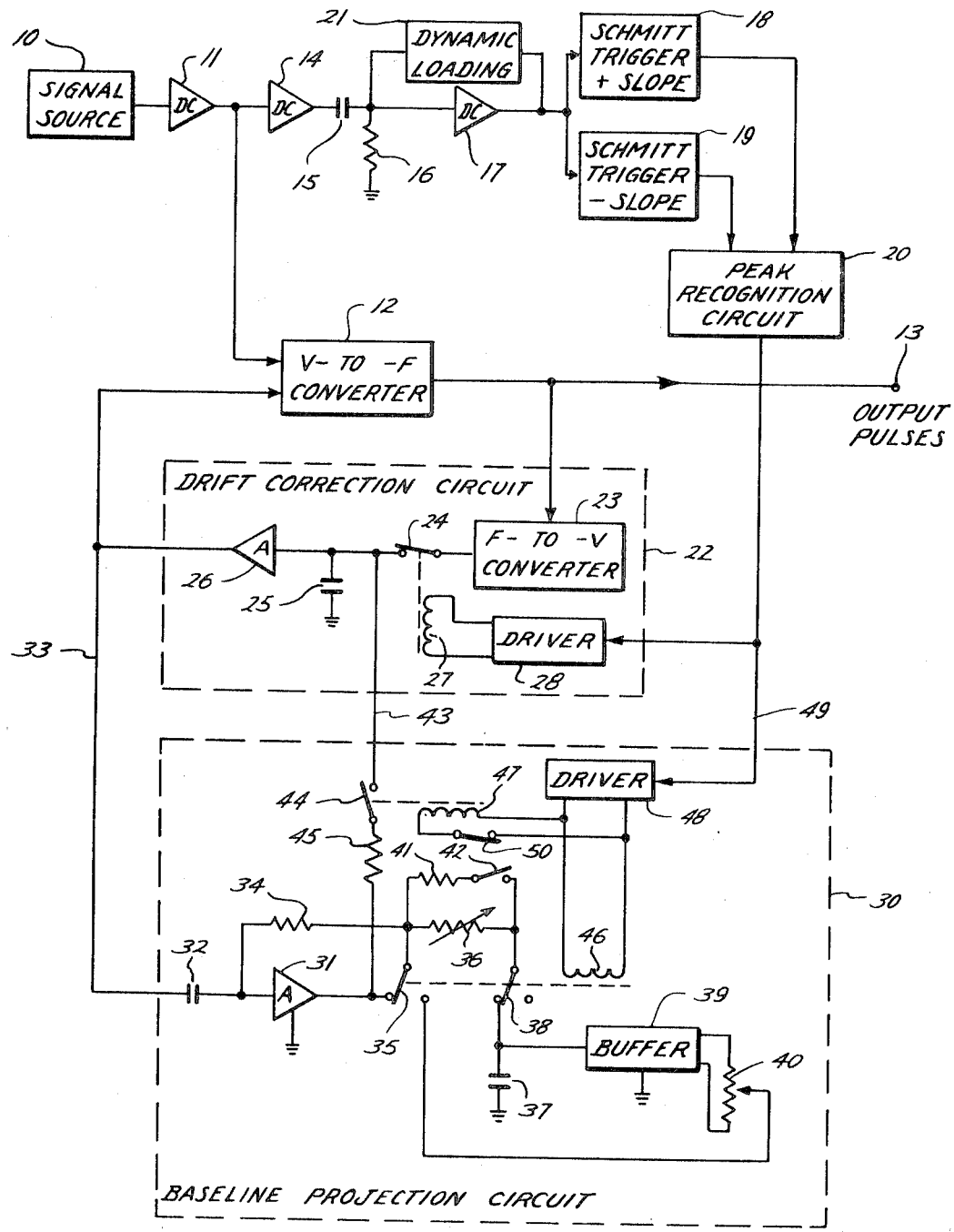

3,628,003

BASELINE PROJECTION APPARATUS FOR USE WITH BASELINE DRIFT CORRECTION CIRCUITS

BACKGROUND OF THE INVENTION

This invention relates to drift correction circuits for use with analytical measuring instruments.

Various types of analytical measuring instruments used in the fields of chemical analysis and clinical chemistry produce measurement signals having recurrent data fluctuations which extend from a baseline value. Typical of such instruments are gas chromatographs and amino-acid analyzers. As is known, the running of an analysis on a given sample or specimen requires a fairly extended length of time, sometimes as much as several hours or more. During the greater portion of a given analysis run, the measurement signal from the measuring instrument will remain at a quiescent or baseline value. At recurrent intervals, a significant occurrence will take place in the analysis and the measurement signal will make a substantial departure from the baseline value for a short period of time and then return to the baseline value. One of the parameters of interest is the area falling under the curve produced by such data fluctuation.

It is often desired to employ automatic data readout equipment for purposes of automatically integrating the areas under such data fluctuations and providing a numerical printout of the integrated values. Unfortunately, the baseline value of the measurement signal frequently tends to drift from its original value during the course of the analysis. This drift introduces errors into the values recorded by the automatic data readout equipment.

In U.S. Pat. No. 3,475,600, granted to David W. Spence on Oct. 28, 1969, for "Base Line Control Circuit Means," there is described a drift correction circuit which is particularly useful with one form of data readout equipment for substantially minimizing the effect of such baseline drift on the operation of the readout equipment. This drift correction circuit is continuously operative during the intervals between the occurrences of the data fluctuations for purposes of monitoring the measurement signal and developing a correction signal which is then combined with the measurement signal to hold the signal level substantially constant. This eliminates the baseline drift during such intervals. During the occurrence of a data fluctuation, the drift correction circuit is disabled and at that time provides a constant correction signal corresponding to the value of the correction signal immediately preceding the occurrence of the data fluctuation.

In the majority of situations, the drift correction circuit described in the Spence patent provides quite adequate correction of the baseline drift. As long as the rate of change of such drift is relatively slow, such that very little change occurs during the time occupied by the data fluctuation, the correction or compensation provided by the Spence circuit is quite accurate. In some cases, however, relatively rapid changes in drift rate are encountered. In such cases, a substantial change in the baseline value can and does occur during the time interval occupied by a data fluctuation. In such cases, the constant correction signal supplied by the Spence circuit is not adequate to prevent some error from being introduced into the readout of the data readout system.

SUMMARY OF THE INVENTION

It is an object of the invention, therefore, to provide new and improved baseline projection apparatus for enabling more accurate correction of baseline drift in various situations.

It is another object of the invention to provide new and improved baseline projection apparatus for use with drift correction circuits for providing improved baseline drift correction for the case of relatively rapid drift rates.

In accordance with the invention, there is provided baseline projection apparatus for use with a readout system which is used with analytical measuring instruments which produce measurement signals having recurrent data fluctuations which extend from a baseline value. The readout system includes drift correction circuit means operative during the nonoccurrence of data fluctuations for modifying the measurement signal to minimize baseline drift components therein. The baseline projection apparatus comprises circuit means adapted to be coupled to the readout system for developing a signal indicative of the slope of the unmodified measurement signal. The baseline projection apparatus also includes circuit means for storing the slope-indicative signal occuring during the nonoccurrence of a data fluctuation. The baseline projection apparatus further includes circuit means adapted to be coupled to the readout system and responsive to the stored slope-indicative signal for continuing the modification of the measurement signal during the occurrence of a data fluctuation at a rate dependent on the value of the slope-indicative signal stored immediately preceding the occurrence of the data fluctuation.

For a better understanding of the present invention together with other and further objects and features thereof, reference is had to the following description taken in connection with the accompanying drawing, the scope of the invention being pointed out in the appended claims.

BRIEF DESCRIPTION OF THE DRAWING

The single FIGURE of the drawing shows an electrical circuit diagram, partly schematic, of a portion of a readout system for use with analytical measuring instruments and including baseline projection apparatus constructed in accordance with the present invention.

DESCRIPTION OF THE PREFERRED EMBODIMENT

Referring to the drawing, there is shown an analytical measuring instrument, represented by signal source 10, which produces a measurement signal having recurrent data fluctuations which extend from a baseline value. The measuring instrument represented by signal source 10 may be, for example, a gas chromatograph, an amino-acid analyzer, or the like. The measurement signal from source 10 is supplied to automatic data readout equipment, part of which is represented by the remainder of the circuits in the drawing. In particular, the signal from source 10 is supplied by way of an amplifier 11 to a first input terminal of a voltage-to-frequency converter 12. Converter 12 produces output pulses at a rate which is proportional to the amplitude of the incoming analog measurement signal. These output pulses are supplied by way of terminal 13 to a digital pulse counter (not shown) and a digital printout device (not shown) which sum up or integrate the number of pulses occurring during each data fluctuation and produce numerical printouts of the resulting integrated values.

The readout system also includes recognition circuit means for recognizing the occurrence of data fluctuations in the measurement signal. This recognition circuit means includes an amplifier 14 which feeds the measurement signal to a differentiating circuit formed by a capacitor 15 and a resistor 16. The differentiated signal, which is proportional to the slope of the measurement signal, is supplied by way of an amplifier 17 to a pair of Schmitt trigger circuits 18 and 19. Schmitt trigger 18 produces an output impulse when the slope of the measurement signal exceeds a preset positive value, while Schmitt trigger 19 produces an output impulse when the slope of the measurement signal exceeds a preset negative value. Thus, Schmitt trigger 18 detects the onset of a data fluctuation and Schmitt trigger 19 detects the termination of a data fluctuation. These impulses are supplied to a peak recognition circuit 20 which, in response thereto, generates a binary-type control signal having one value during the occurrence of a data peak and a second and different value during the nonoccurrence of a data peak. A dynamic loading circuit 21 is connected in parallel with the amplifier 17 to improve the speed of response.

The readout system further includes a drift correction circuit 22 which is operative during the nonoccurrence of data fluctuations for modifying the measurement signal to minimize baseline drift components therein. The input of this drift correction circuit 22 is connected to the output of the voltage-to-frequency converter 12. The pulses from converter 12 are thus supplied to a frequency-to-voltage converter 23 which produces an analog output signal having an amplitude proportional to the rate of occurrence of the pulses. This analog output signal is thus a replica of the original measurement signal, less any correction signal. This analog output signal is supplied by way of a relay controlled switch 24 (when closed) to an analog signal storage device represented by a storage capacitor 25. At the same time, this analog signal is supplied back to a second input terminal of the converter 12 by way of a direct-current amplifier 26. Amplifier 26 is of a type having a very high input impedance and, as such, the input stage thereof preferably employs a field effect transistor. The signal appearing at the output of amplifier 26, which signal corresponds to the signal stored on capacitor 25, constitutes a drift correction signal which balances out or cancels any drift component in the measurement signal supplied to the first input terminal of the voltage-to-frequency converter 12.

The switch 24 serves to control the operating mode of the drift correction circuit 22. This switch 24 is controlled by a relay solenoid 27 which, in turn, is controlled by a relay driver circuit 28. Driver circuit 28 is, in turn, controlled by the binary control signal produced by the peak recognition circuit 20. As a consequence, switch 24 is closed (position shown) during the nonoccurrence of a data fluctuation. During this mode, the drift correction circuit 22 constitutes a negative feedback circuit which operates to hold constant at a negligibly low level the data value (pulse rate) at the output of the voltage-to-frequency converter 12. This produces a constant baseline value at the output of the converter 12.

During the occurrence of a data fluctuation, on the other hand, switch 24 assumes an open condition. This breaks the feedback loop. The storage capacitor 25 then functions to supply a constant correction signal to the second input terminal of the converter 12. The value of this constant correction signal is determined by the baseline value which existed immediately preceding the occurrence of the data fluctuation. Consequently, if there is no substantial change in the baseline value during the occurrence of the data fluctuation, then this constant correction signal serves to provide the proper amount of drift correction during such data fluctuation. After termination of the data fluctuation, switch 24 again closes and the drift correction circuit 22 resumes its tracking of the measurement signal and its automatic correction of any changes in the baseline value of such measurement signal.

The circuits described up to this point are also shown and described in the above-mentioned U.S. Pat. No. 3,475,600, to Spence. In general, they are described in considerably greater detail in said Spence patent. Consequently, further discussion thereof is unnecessary herein.

Considering now the novel baseline projection apparatus of the present invention, a preferred embodiment thereof is represented by baseline projection circuit 30. This baseline projection circuit 30 includes circuit means adapted to be coupled to the data readout system for developing a signal indicative of the slope or rate of change of the unmodified measurement signal. This circuit means includes a direct-current signal amplifier 31 and differentiating circuit means represented by a capacitor 32 having one side coupled to the input of such amplifier 31 and having the other side thereof coupled to the output of the drift correction circuit 22 by way of a conductor 33. Resistive impedance means, represented by a resistor 34, is adapted during one mode of operation to be connection between the input and output of the amplifier 31. The connection to the output is controlled by first switch means represented by a relay controlled switch 35. Resistor 34 preferably has a high resistance value on the order of several megohms. Amplifier 31 preferably has a very high value of input impedance and, as such, the input stage thereof is preferably formed by a field effect transistor. Amplifier 31 is also of the signal-inverting type such that the output signal is opposite in polarity to the input signal. With switch 35 in the position shown, elements 31, 32, and 34 function as a differentiating circuit and the signal at the output of amplifier 31 is proportional to the slope or rate of change of the unmodified measurement signal, the latter being ascertained by monitoring the output of the drift correction circuit 22 which, in turn, is tracking the measurement signal.

The baseline projection circuit 30 also includes circuit means for storing the slope-indicative signal occurring during the nonoccurrence of a data fluctuation. This circuit means includes resistive impedance means represented by an adjustable resistor 36 and analog signal storage means represented by a storage capacitor 37. On side of resistor 36 is connected to the resistor 34 and the other side of resistor 36 is, during one operating mode, connected to the capacitor 37 by way of a second switch means represented by a relay controlled switch 38. For purposes of reading the signal stored on the capacitor 37, a direct-current buffer circuit 39 is connected thereto. The input side of the buffer 39 is connected to capacitor 37 and the input impedance thereof is preferably of a very high value. As such, the input stage of buffer 39 is preferably provided by a field effect transistor. Coupled across the output of buffer 39 is a potentiometer 40, the sliding contact of which is connected to a second terminal of the first switch 35.

Adjustable resistor 36, which determines the time constant for the storage process for slope-indicative signal, may take the form of a multitapped resistor network capable of providing in a stepwise manner resistance values ranging from one to approximately 70 megohms. Capacitor 37 is preferably of a high-quality polystyrene type. Connected in parallel with the time constant resistor 36 is a "quick set" mechanism formed by a resistor 41 connected in series with a pushbutton switch 42. Resistor 41 is of a relatively low value which may be, for example, on the order of 330 k$\Omega$.

The baseline projection circuit 30 further includes circuit means adapted to be coupled to the readout system and responsive to the stored slope-indicative signal for continuing the modification of the measurement signal during the occurrence of a data fluctuation. This circuit means includes signal transfer means represented by a conductor 43 adapted to be coupled to the analog signal storage capacitor 25 in the drift correction circuit 22 and third switch means represented by a relay-controlled switch 44 for coupling the conductor 43 to the output of the amplifier 31 during the occurrence of a data fluctuation. A resistor 45 is connected in series between the switch 44 and the output of amplifier 31. Resistor 45 preferably has a relatively high resistance value on the order of several megohms. As will be seen, this circuit means for continuing the modification of the measurement signal also makes use of and includes amplifier 31, differentiating capacitor 32, and resistor 34.

The first and second switches 35 and 38 are ganged together and are controlled by a common relay solenoid 46. The third switch 44 is controlled by a relay solenoid 47. Both of relay solenoids 46 and 47 are driven by a relay driver circuit 48 which is, in turn, responsive to the binary control signal generated by the peak recognition circuit 20, the connection thereto being made by way of a conductor 49. A switch 50 is connected in series with the relay solenoid 47. This switch 50, in effect, constitutes an "on-off" switch for the baseline projection circuit 30. When switch 50 is closed, the circuit 30 provides the desired baseline projection. When switch 50 is open, the projection circuit 30 is disabled and no projection is provided.

Considering now the operation of the baseline projection circuit 30 and assuming that switch 50 is closed, such circuit 30 has two different operating modes, the same as does the drift correction circuit 22. One mode exists during the nonoccurrence of a data fluctuation, while the other mode exists during the occurrence of a data fluctuation. The various switches shown in the drawing are shown in the positions they occupy during the first of these modes, namely, during the nonoccurrence of a data fluctuation. In this mode, the baseline projection circuit 30 operates to track the slope or rate of change of the measurement signal and to store the resulting slope-indicative signal on the analog memory or storage capacitor 37. During this tracking mode, the correction signal appearing at the output of drift correction circuit 22 is differentiated by the capacitor 32 to provide a slope-indicative signal. This slope-indicative signal is amplified by the amplifier 31 and is then supplied by way of switch 35, time constant resistor 36, and switch 38 to the slope memory capacitor 37. This is a continuously updated type of storage in that the signal stored on the capacitor 37 varies as the output of the drift correction circuit 22 varies. During this tracking mode, the switch 44 is open and the baseline projection circuit 30 does not affect the operation of the drift correction circuit 22.

Upon the occurrence of a data fluctuation, the baseline projection circuit 30 shifts over to its second operating mode which, for sake of a name, will be called the "projecting" mode. In this mode, switches 35 and 38 move to their right-hand contacts and switch 44 closes. This causes the slope-indicative signal stored on the capacitor 37 to be supplied to the input of the amplifier 31, where it then functions as a slope reference signal. This signal on capacitor 37 is supplied to the input of amplifier 31 by way of a buffer circuit 39, potentiometer 40, switch 35 and resistor 30. At this time, switch 38 is open and no new signal is being applied to the memory capacitor 37.

During this projecting mode, the amplifier 31 and differentiating capacitor 32 are connected as a feedback path around the capacitor 25 and amplifier 26 in the drift correction circuit 22. In other words, the signal at the output of amplifier 31 is fed back to the capacitor 25 by way of resistor 45, switch 44 and conductor 43. At this time, drift correction circuit switch 24 is open. This feedback loop functions to force the signal voltage on the correction circuit capacitor 25 to vary in a continuous, linear manner at a rate determined by the value of the slope-indicative signal being supplied to the amplifier 31 by the slope memory capacitor 37. In other words, the dynamics of the feedback loop are such that it seeks to reduce the output signal at the output of the amplifier 31 to a very small value approximately zero. In order to do this, the signal being supplied by way of differentiating capacitor 32 must be equal in magnitude and opposite in polarity to the signal being supplied by way of resistor 34. Since capacitor 32 is providing a differentiating action, this means that the signal voltage on the correction circuit capacitor 25 must change at a rate to provide a differentiated slope value which matches the stored slope being supplied by the slope memory capacitor 37. Amplifier 31 supplies the necessary signal to the correction circuit capacitor 25 to effect this change. The matter of the signals supplied by way of capacitor 32 and resistor 34 being of opposite polarity is taken into account by the fact that the slope-indicative signal derived during the tracking mode was inverted by the amplifier 31 before it was stored on the slope memory capacitor 37.

The changing of the signal voltage on the correction circuit capacitor 25 during the projecting mode means that the correction signal being supplied to the voltage-to-frequency converter 12 is being varied during the occurrence of a data fluctuation at a linear rate based on the rate of change in baseline which existed immediately preceding the occurrence of the data fluctuation. This enables the elimination of baseline drift errors for the case of relatively rapid drift rates.

In the normal operation of the baseline projection circuit 30, the potentiometer 40 is initially adjusted to provide a zero output with an input signal of constant amplitude being applied at the input of the amplifier 11. In other words, the slope-indicative signal on the sliding contact of potentiometer 40 should be zero at this time and the potentiometer 40 is adjusted to accomplish this end. Among other things, this balances out the zero offset occurring in the buffer circuit 93.

It is next necessary to set the time constant resistor 36 at an appropriate value. The fact that the slope-indicative signal is subjected to a time constant effect in the process of putting it on the capacitor 37 means that the signal which is actually stored on the capacitor 37 is an average signal representing an average of the signal values occurring over a certain time interval. Roughly speaking, the slope-indicative signal is averaged over a time interval corresponding approximately to twice the RC time constant established by resistor 36 and capacitor 37. In most cases, the resistor 36 should be adjusted to provide a time constant which is as long as possible but which is, at the same time, significantly less than the time during which exists the particular slope which it is desired to store. In other words, a decision has to be made as to the length of the time interval immediately preceding the occurrence of a data fluctuation one wants to be included in the average. For a relatively high degree of precision, the resistor 36 should be set to provide a time constant of less than one-half of the selected length for the slope averaging interval.

The desired length for the averaging interval will, of course, be dependent on the particular type of analytical measuring instrument which is being used and on the particular type of analysis which is being performed.

The quick set switch 42 enables a quick updating of the stored slope-indicative signal by sharply reducing the time constant for the storage process.

If desired, the baseline projection circuit can be operated so that the baseline is projected during the occurrence of data fluctuations at a slope differing by a desired amount from the average measurement signal slope which actually preceded the data fluctuation. This is accomplished by shifting the sliding contact of the potentiometer 40 by the appropriate amount relative to the initial slope zero setting or position thereof. This manner of operation can be used to compensate for a curving baseline.

For the special case where a series of closely spaced data fluctuations exist in the measurement signal, the time constant setting of the resistor 36 should be set to provide a time constant which equals as nearly as possible the time across the base of a typical fluctuation in the series. This provides a self-correcting feature which enables a more accurate slope-indicative signal to be stored by the slope memory capacitor 37 even though little baseline is available between data fluctuations on which to base the slope measurement.

The baseline projection circuit 30 may be included as an integral part of the data readout equipment. Alternately, the baseline projection circuit 30 can be provided as a separate accessory which can be connected to existing readout equipment which lacks a projection capability. In this case, the conductors 33, 43 and 49 could be included as part of a connecting cable interconnecting the baseline projection accessory with the readout equipment proper.

In the foregoing embodiment, the measurement signal was tracked by connecting the input of the baseline projection circuit 30 to the output of the drift correction circuit 22. It should be noted, however, that the slope-indicative signal can instead be obtained directly from the measurement signal itself. One manner of accomplishing this would be to connect the input conductor 33 to a relay controlled switch such that during the nonoccurrence of a data fluctuation, the conductor 33 would be connected to the output of the amplifier 11, while during the occurrence of a data fluctuation the conductor 33 would be connected to the output of the correction circuit amplifier 26.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Baseline projection apparatus for use with a readout system which is used with analytical measuring instruments which produce measurement signals having recurrent data fluctuations which extend from a baseline value and wherein the readout system includes drift correction circuit means operative during the nonoccurrence of data fluctuations for modifying the measurement signal to minimize baseline drift components therein, the baseline projection apparatus comprising:

first circuit means responsive to the readout system for developing a signal indicative of the slope of the unmodified measurement signal;

second circuit means responsive to the slope-indicative signal for storing the slope-indicative signal occuring during the nonoccurrence of a data fluctuation;

and third circuit means coupled to the readout system and responsive to the stored slope-indicative signal for continuing the modification of the measurement signal during the occurrence of a data fluctuation at a rate dependent on the value of the slope-indicative signal stored immediately preceding the occurrence of the data fluctuation.

2. Baseline projection apparatus in accordance with claim 1 wherein the first circuit means for developing the slope-indicative signal is coupled to the output of the drift correction circuit means.

3. Baseline projection apparatus in accordance with claim 1 wherein the first circuit means for developing a slope-indicative signal includes a differentiating circuit.

4. Baseline projection apparatus in accordance with claim 1 wherein the second circuit means includes a storage for providing the storage function.

5. Baseline projection apparatus in accordance with claim 1 wherein the second circuit means includes a storage capacitor, adjustable resistance means for feeding the slope-indicative signal to the storage capacitor and high-input impedance buffer circuit means coupled to the storage capacitor for supplying the slope-indicative signal to the circuit means which continues the modification of the measurement signal during the occurrence of a data fluctuation, the adjustable resistance means enabling adjustment of the time constant of the slope signal storage process for adjusting the time interval over which the slope-indicative signal is averaged.

6. Baseline projection apparatus in accordance with claim 1 wherein the drift correction circuit means in the readout system includes analog signal storage means for enabling a constant modification to be applied to the measurement signal during the occurrence of a data fluctuation and wherein the first circuit means which develops the slope-indicative signal includes a differentiating circuit coupled in cascade with an amplifier with the input of the differentiating circuit being coupled to the output of the drift correction circuit means and wherein the third circuit means which continues the modification of the measurement signal during the occurrence of a data fluctuation includes means for coupling the signal storing circuit means of the baseline projection apparatus to the input of the amplifier during the occurrence of a data fluctuation and means for coupling the output of the amplifier to the analog signal storage means in the drift correction circuit means during the occurrence of a data fluctuation.

7. Baseline projection apparatus for use with a readout system which is used with analytical measuring instruments which produce measurement signals having recurrent data fluctuations which extend from a baseline value and wherein the readout system includes drift correction circuit means operative during the nonoccurrence of data fluctuations for modifying the measurement signal to minimize baseline drift components therein and wherein drift correction circuit means includes analog signal storage means for enabling a constant modification to be applied to the measurement signal during the occurrence of a data fluctuation, the baseline projection apparatus comprising:

a signal amplifier;

differentiating circuit means having one side coupled to the input of said amplifier and adapted to have the other side coupled to the output of the drift correction circuit means;

impedance means having a first point at one end, a second point at the other end, and an intermediate point therebetween, such first point being coupled to the input of the amplifier;

analog signal storage means;

first switch means for coupling the intermediate point to the output of the amplifier during the nonoccurrence of a data fluctuation and to the projection apparatus signal storage means during the occurrence of a data fluctuation;

second switch means for coupling the second point to the projection apparatus signal storage means during the nonoccurrence of a data fluctuation;

signal transfer means adapted to be coupled to the analog signal storage means in the drift correction circuit means;

and third switch means for coupling the output of the amplifier to the signal transfer means during the occurrence of a data fluctuation.

8. Baseline projection apparatus in accordance with claim 7 wherein the differentiating circuit means comprises a capacitor having one side coupled to the input of the amplifier and the other side coupled to the output of the drift correction circuit means.

9. Baseline projection apparatus in accordance with claim 7 wherein the impedance means comprises a pair of resistors means connected in series with the intermediate point therebetween being the intermediate point of the impedance means.

10. Baseline projection apparatus in accordance with claim 9 wherein the resistor located between the intermediate point and the second point is an adjustable resistor for enabling adjustment of the time constant for the signal storage process which occurs when the amplifier output signal is being fed to the projection apparatus analog signal storage means for adjusting the time interval over which the differentiated signal is averaged.

11. Baseline projection apparatus in accordance with claim 7 wherein the analog signal storage means in the baseline projection apparatus includes a storage capacitor for providing the storage function.

12. Baseline projection apparatus in accordance with claim 11 wherein the analog signal storage means in the projection apparatus further includes a high input impedance buffer circuit having its input connected to the storage capacitor and having its output coupled to the first switch means.

13. Baseline projection apparatus in accordance with claim 7 wherein the readout system includes recognition circuit means for recognizing the occurrence of data fluctuations in the measurement signal and wherein the first, second, and third switch means of the baseline projection apparatus are coupled to and controlled by such recognition circuit means.

* * * * *

UNITED STATES PATENT OFFICE
CERTIFICATE OF CORRECTION

Patent No. 3,628,003      Dated December 14, 1971

Inventor(s) DAVID W. SPENCE

It is certified that error appears in the above-identified patent and that said Letters Patent are hereby corrected as shown below:

Column 2, line 8, change "occuring" to --occurring--.
Column 2, line 67, change "binary-type" to --binary type--.
Column 3, line 68, change "connection" to --connected--.
Column 3, line 75, change "signal-inverting" to --signal inverting--.
Column 4, line 13, change "On" to --One--.
Column 4, line 31, change "high-quality" to --high quality--.
Column 4, line 35, change "k$\Omega$" to --kilohms--.
Column 4, line 44, change "relay-controlled" to --relay controlled--.
Column 5, line 73, change "93" to --39--.
Column 7, line 33, change "high-input" to --high input--.
Column 8, line 37, cancel "means".

Signed and sealed this 23rd day of May 1972.

(SEAL)
Attest:

EDWARD M. FLETCHER, JR.
Attesting Officer

ROBERT GOTTSCHALK
Commissioner of Patents